Figure 1:
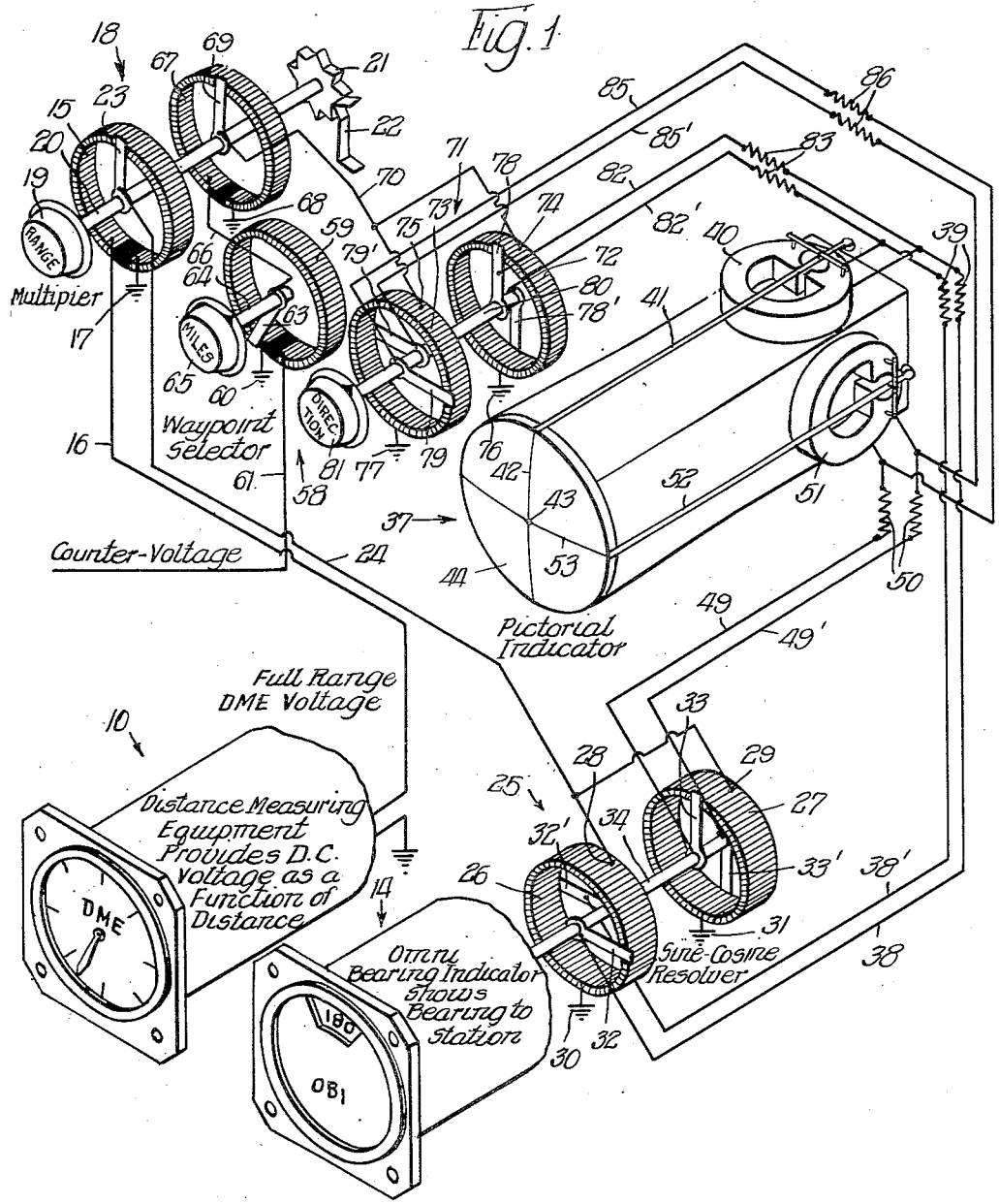

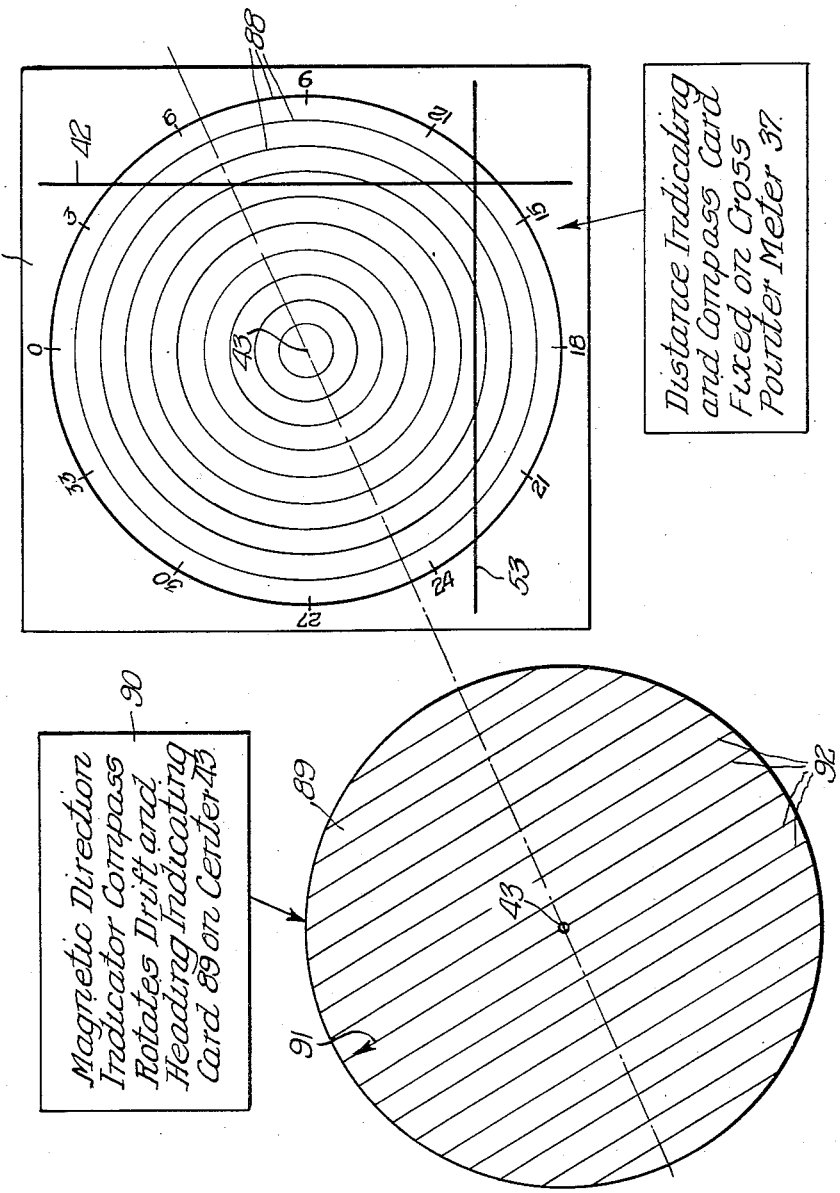

2,801,051

NAVIGATIONAL SYSTEM

Earl S. Perkins, Hinsdale, Ill., assignor to Butler Company, Chicago, Ill., a corporation of Illinois Application June 28, 1954, Serial No. 439,504

7 Claims. (Cl. 235—61)

This invention relates, generally, to navigational systems and it has particular relation to systems for navigating air craft. However, it is not limited to such craft and it can be used for navigating other craft such as a ship.

When flying an aircraft, the pilot is involved in solving a highly complex equation. This equation, called navigation, is vectorial in essence and the variables involved are subject to change without notice. Reference is here made to drift, airspeed, ground speed, magnetic variation, visibility and others. As certain conditions, such as weather, proximity to traffic areas, etc. become increasingly less conducive to a solution of this problem, the need for an accurate solution thereof becomes more vital and the equation itself becomes more complex.

Most pilots, through experience, have developed a navigation sense. While involved in keeping a craft in proper attitude under adverse conditions, receiving commands from traffic control, and signals from navigational aids, the pilot must evalute continually the vectors involved and change the heading of the craft in order to make good the present course or the new courses required. A skilled pilot can navigate the craft through obscurement for a thousand miles at 300 miles an hour and enter a harbor barely as wide as the craft or ship. A pilot is not necessarily aware of the difference of mental processes used in maintaining attitude when involved in instrument flying over those used in contact flying. However, he is invariably aware of the reluctance of his mental processes to change from one method to the other. Before making a transition from instrument flying to contact flying, the pilot should first ascertain that he will remain clear of all obscurement.

When one walks through a house one unconsciously and somewhat miraculously solves a highly complex problem by employing perspective sense. This is accomplished without actual awareness of the problem involved or the use of the perspective sense. If a room were built with all lines, including those of window frames, walls, furniture, etc. converging at point short of the horizon, it would be difficult to walk in such a room because of the confusion in perspective that would be experienced. Unless one were to try out such as an experiment one might assert that such a vital sense is not possessed by a human being. An airplane pilot, with a highly developed mental perspective which he uses a navigate an air craft, might also deny that a special mental process is involved. The mental perspective here referred to which an experienced airplane pilot uses has to do with a method of sampling available information. In the room with the distorted perspective referred to, one could, by moving the head from one side to the other, discover by noting the abstract motion that an object is near rather than far. This method of sampling available information can be called the exercise of kinetomatic sense. It is closely related to the visionless perspective of an experienced airplane pilot.

Several variables are involved in the problem of maintaining an attitude of an airplane in flight. When operating on instruments the pilot is concerned with maintaining the proper static position so as to make good the dynamic results required. The static condition has to do with roll, pitch and yaw. To maintain continuity of pitch, roll and yaw, the pilot obtains digital information from various instruments and applies pressure to the controls to correct any error which is evident. An automatic pilot is a computer which takes similar information in small increments, samples it, converts it to analog information, magnifies it and applies measures to the ship to correct error in progress before there is appreciable magnitude of error. The use of the automatic pilot is the more rapid and accurate of the two methods of flight. Many systems have been devised wherein the computations of error in process are made and displayed on a meter rather than being applied to a mechnical servo pilot. The human pilot watching this meter makes corrections necessary to halt increments of error before there is evidence of substantial error magnitude. At the present state of these deevlopments the pilot can fly with reasonable assurance that, after a period of flight, the ship will have maintained the desired attitude, arrived at the desired altitude but there is no assurance that the continuity of azimuth has resulted in the proper course over the ground. Therein lies the science of navigation.

In order to advance the state of development of a steering computer so as to equal that of the static position computer, such steering computer should have means of resolving small increments of error in azimuth which would result in error of course. Also such a computer should have means to magnify and show these increments in such manner as to allow the pilot to correct the error in process before the error becomes too great. This should hold true irrespective of the direction of flight or the distance from a particular station and also whether the ship is circling or maneuvering.

It is pointed out that even in the simple problem in which the destination is visible on the distant horizon, heading the ship toward that destination will not necessarily result in a predetermined course. If there is a wind affecting the course of the ship, the azimuth to which the ship must be held in order to cause it to describe a straight line to the destination can only be determined by trial and error. In contact flying a small area beneath the ship is observed and then a short visual course is projected toward the destination. The pilot watches the progress over this integrant of course, and from the results of this observation, determines his proper heading. An instrument which will magnify and display this integrant lends means to improve the accuracy of the resulting course. A skilled pilot rarely refers to the terrain. His knowledge of the position and course results from analyses of information obtained from radio, from the magnetic compass and from his navigation sense. A terrain feature is useless even when identified except as an assurance of position but the position usually predicates the identification.

Numerous pictorial indicators have been made in which the radio station supplying navigational information is displayed in the center of a circular map of an area. A small airplane is caused to move over the map by a servo mechanism. The position of the model airplane is determined from VOR (Visual Omni Range) and DME (Distance Measuring Equipment) signals received from the radio station by the aircraft using the device. Thus the position of the model ship on the map relative to the portrayed radio station is the position of the craft with respect to the area served by the radio station and represented by the map. The complexity of the servo mechanism in such a pictorial computer limits the presentation to one in which the radio station is in the center of the map. The maps are usually limited to two whose areas are arbitrarily represented by 15 and 150 mile radii. If the destination of the ship is on the chart in use, a course is tried which projects to this destination and the progress of the model ship is noted by trial and error. The length of the trial period is a function of the area of the chart and the speed of the ship. To some extent it is a function of the size of the model which is usually large as compared to the terrain feature. If the destination is over 15 miles from the radio station, the large area chart must be used. As a result the model airplane silhouette then covers relatively many square miles of area and small integrants of course are indeterminable.

The usefulness of such a pictorial computer lies in bringing into visibility the triangle or vectors previously described which otherwise are carried in the mind of the pilot. The ability of such a device to aid in solving navigational triangles increases as the area represented by the chart decreases. However, this usefulness is limited as the ship nears the cone of confusion at the station. If this cone of confusion did not exist, the pilot of a ship with a pictorial computer displaying an area represented by a two mile radius, for example, would find that he could quickly and accurately determine not only the present position, but also the future positions relative to the station. This is because his kinetomatic sense is being supplied with greater kinetomatic information, i. e., the same type of information that his eyes interpret when the ship is circling an airport and the same is visible. His sense of orientation is obtained more normally and the pilot is at ease. One reason for the increase in kinetomatic information is the speed of the ship relative to the limited portrayed area.

If a known waypoint remote from the radio station and unaffected by the cone of confusion is portrayed in the center of a pictorial type of computer with the magnitude of the area represented by the instrument selectable with respect to the speed of the ship, the value of such an instrument to augment the ability of the pilot to orient himself would not be limited to the area near the radio station. If a course to be followed is considered as a series of accurately determinable waypoints and areas, the progress to the destination can be determined accurately by the pilot by measuring or sensing the vectors involved as the ship approaches, leaves, or by-passes each waypoint, or circles an airport or holding point. If the latitude and longitude are determinable for each waypoint, the device need not portray a map of the area and the position of the ship with reference to a terrain feature can be determined by reference to a chart. If the terrain feature is of other than secondary importance, it can be selected as a waypoint or a destination. The position of the ship can be represented on a simulated chart by cross pointers showing the rectangular coordinates of the position of the ship. The distance and polar coordinates of the ship with respect to the waypoint and the heading of the ship can be displayed on the chart. The size of the point corresponding to the ship is as small as can be represented by the intersection of the pointers. The pointers can automatically be repositioned relative to the waypoint portrayed at the center of the instrument so as to correspond to the actual course of the ship over the area represented by the instrument. In addition the scale at which the area surrounding the waypoint is shown can be varied so as to vary the magnification provided by the instrument to suit the particular situation involved. Any particular waypoint can be selected accurately and portrayed at the center of the instrument with information respecting direction and distance from the VOR—DME station which can be employed to control the operation of the instrument.

Among the objects of this invention are: To provide for indicating to the pilot of a craft its position with respect to a reference point on the earth by employing signals transmitted to the craft from said point corresponding to the distance and position of the craft with respect to said point; to indicate to the pilot the position of the craft with respect to a known waypoint by using the same data; to magnify the indication so that the same can be interpreted with a high degree of accuracy; to provide on the craft a voltage the magnitude of which represents the distance the craft is from the reference point and to resolve that voltage under the control of signals transmitted from said point into two components corresponding to the rectangular coordinates of the craft with respect to said reference point; to measure these components by a cross pointer meter; to modify the operation of the cross pointer meter by two voltages which correspond to the rectangular coordinates of a waypoint with respect to said reference point to the end that the intersection of the pointer shows the position of the craft with respect to said waypoint; and to magnify the voltages applied to the meter whereby the same can be read at an enlarged scale.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 1 illustrates diagrammatically and in perspective a navigation system constructed in accordance with this invention; and Figure 2 shows how the cross pointer meter used in the system shown in Figure 1 can be adapted to display more complete data with reference to the position and course of the craft being navigated.

Referring now particularly to Figure 1 it will be observed that the reference character 10 designates distance measuring equipment which is carried by the craft and forms a part of a radio distance indicating system that is controlled by a radio transmitter at a reference point on the earth. Not only does the equipment 10 indicate the distance from the reference point but also it is arranged to provide a direct voltage the magnitude of which is a function of the distance between the craft and the reference point. Operating in conjunction with the distance measuring equipment 10 on the craft is an omni bearing indicator 14 which now only shows the bearing of the course that the craft should follow to reach the point of origin of the signals but also it is employed, as will be described hereinafter, to control the resolution of the voltage derived from the distance measuring equipment 10 into rectangular coordinates which are measured in such manner as to indicate on the craft its position with respect to the reference point or its position with reference to a waypoint as the case may be.

The range at which the navigational system disclosed herein operates is controlled, in part, by a variable resistance device 15 in the form of a potentiometer which, as shown, is connected by a conductor 16 to the distance measuring equipment 10. It will be noted that the variable resistance device 15 is grounded at 17 and that it forms a part of a range multiplier or magnifying means that is designated, generally, by the reference character 18. The range multiplier 18 is adjusted by a knob 19 which is fast on a shaft 20 that carries at its opposite end a sprocket wheel 21 having a click spring 22 cooperating therewith. It will be understood that the click spring 22 holds the sprocket wheel 21 and the shaft 20 in any position in which it may be set by operation of the knob 19. This position is determined by the degree of multiplication or magnification at which it is desired to operate the navigation system. Movable with the shaft 20 is a contact arm 23 which engages the turns of the variable resistance device 15 and picks off an appropriate voltage depending upon the setting of the knob 19. A conductor 24 interconnects the contact arm 23 with a sine-cosine resolver that is shown, generally, at 25. The sine-cosine resolver 25 comprises a sine impedance device 26 and cosine impedance device 27. The devices 26 and 27 are potentiometers, circular in form, that are closed upon themselves and they are connected, respectively, at 28 and 29 to the conductor 24. At diametrically opposite points the impedance devices 26 and 27 are grounded at 30 and 31. Contact arms 32 and 32' cooperate with the sine impedance device 26 and similar contact arms 33 and 33' cooperate with the cosine impedance device 27. The contact arms 32—32' and 33—33' are carried by a shaft 34 and are so positioned thereon, as shown, that they are in 90° spaced relation with respect to each other. In the illustration shown in the drawing the contact arms 32 and 32' occupy a position midway between the diametrically opposite points 28 and 30 on the sine impedance device 26. Since the contact arms 32 and 32' extend oppositely of each other, in this position they contact points of equal potential on the sine impedance device 26 and no voltage appears between the contact arms 32 and 32'. Since the contact arms 33 and 33' extend opposite to each other and at right angles to the contact arms 32 and 32', in the position shown in the drawing maximum voltage is impressed between the contact arms 33 and 33'. The polarity of this voltage will depend upon whether the arm 33 is in the uppermost or lowermost position.

When the sine-cosine resolver 25 occupies a position corresponding to the zero or 360° position of the omni bearing indicator 14 the voltage, as stated, between the contact arms 32 and 32' is zero. The voltage between the contact arms 33 and 33' in this position is maximum positive voltage. Now when the shaft 34 is rotated through 90°, the voltage between the contact arms 32 and 32' will be a maximum positive voltage while the voltage between the contact arms 33 and 33' of the cosine impedance device 27 is zero. At positions of the contact arms 32—32' and 33—33' between the 360° position and the 90° position, the voltages appearing therebetween vary respectively between the sine and the cosine of the angle away from the 360° position. For example, when the shaft 34 has been rotated 45° away from the 360° position, the voltage appearing between the contact arms 32 and 32' is 70.71% of the maximum voltage and a like voltage appears between the contact arms 33 and 33'. As the shaft 34 rotates past the 90° position, the same relationships prevail except that the polarity of one or the other of the voltages between the contact arms 32—32' and 33—33' is reversed, depending upon the quadrant occupied by the contact arms.

Provision is made for simultaneously measuring the voltages that exist between the contact arms 32—32' and 33—33'. This measuring means is indicated, generally, at 37 and preferably is in the form of a cross pointer meter. The sine impedance device 26 is connected by conductors 38 and 38' through resistors 39 to vertical pointer moving means 40, preferably in the form of a D'Arsonval type element or measuring device having a zero center. For illustrative purposes it is pointed out that the resistors 39 may have a value of 20,000 ohms each and the moving coil of the vertical pointer moving means 40 may deflect full scale on the flow of 50 micro amperes therethrough. The application of the voltage of the order of one volt across the contact arms 32 and 32' is sufficient to effect a full scale deflection in one direction or the other depending upon the polarity. The moving element of the vertical pointer moving means 40 is arranged to operate a hand 41 that extends horizontally and carries at its outer end a vertical pointer 42. It will be understood that the vertical pointer 42 is arranged to move to the left or right of a reference position 43 on a face 44 of the measuring means or cross pointer meter 37. It will also be understood that the position of the vertical pointer 42 then is determined by the polarity and the magnitude of the voltage appearing between the contact arms 32 and 32'. When this voltage is positive, the vertical pointer 42 moves to the right of the reference position 43. When it is negative it moves to the left. The extent of movement on either side of the reference position 43 depends upon the magnitude of the voltage.

In like manner the cosine impedance device 27 is connected by conductors 49 and 49' through resistors 50 to horizontal pointer moving means 51. Preferably the resistors 50 have the same resistance as the resistors 39 and the horizontal pointer moving means 51 is a duplicate of the vertical pointer moving means 40. However, the horizontal pointer moving means is positioned in such manner as to move a hand 52 operated by the moving element in a vertical plane and thus to move a horizontal pointer 53 above and below the reference position 43 on the face 44.

Assuming now that the range multiplier 18 is so positioned that the full direct current voltage from the distance measuring equipment 10 is applied across the sine-cosine resolver 25, under these circumstances the reference position 43 on the face 44 corresponds to the position of the equipment which is controlling the distance measuring equipment or the position of the reference point on the earth with respect to which the navigation of the aircraft is being accomplished. This voltage is resolved into two components which correspond, respectively, to the rectangular coordinates of the position of the aircraft with respect to the reference point. This is accomplished by the omni bearing indicator 14. For illustrative purposes the indicator 14 shows a reading of 180° which is the course to the point of origin of the signals controlling its operation. Accordingly the contact arms 32 and 32' are positioned so that no voltage is applied thereto. As a result no voltage is applied to the vertical pointer moving means 40 and it remains stationary. However, maximum negative voltage is applied between the contact arms 33 and 33' and this voltage is applied to the horizontal pointer moving means 51 with the result that the horizontal pointer 53 moves up above the reference position 43 to take up a position which corresponds to the magnitude of this negative voltage. Depending upon the calibration of the instrument, the extent of movement of the horizontal pointer 53 above the reference position 43 indicates the distance that the aircraft is away from the reference point. Since the pointers 42 and 53 would now intersect at a position above the reference position 43, the pilot knows that he is due north of the reference position 43 i. e., the reference point is positioned on the chart directly south of his position.

It will be understood that other positions of the aircraft as indicated by the omni bearing indicator 14 will result in corresponding changes in the energization of the pointer moving means 40 and 51. However, under the conditions assumed, the intersection of the pointers 42 and 53 will indicate on the face 44 the position of the aircraft with respect to the reference position 43.

The scale used for interpreting the position of the aircraft with reference to the reference position 43 can be changed by adjusting the variable resistance device 15 so that a predetermined multiple of the voltage controlled by the distance measuring equipment 10 can be applied to the sine-cosine resolver 25. Thus it is possible to have the intersection of the pointers 42 and 53 located at various distances from the reference position 43 to show the same distance between the aircraft and the reference point all depending on the position of the knob 19 of the range multiplier 18.

In view of the fact that the size of the face 44 must necessarily be relatively small it is not possible, even at maximum range setting of the range multiplier 18 to provide as accurate an indication of the position of the aircraft with respect to the reference point as might be desirable. This is the case particularly where the aircraft may be from 50 to 100 miles away from the reference point where the radio transmitter is located that governs the operation of the distance measuring equipment 10 and the omni bearing indicator 14.

In accordance with this invention provision is made for operating the measuring means or cross pointer meter 37 on the basis that the reference point, previously represented by the reference position 43 actually is located off of the face 44. Instead the reference position 43 represents the location of a waypoint the latitude and longitude of which are known precisely to the pilot and which waypoint is in the vicinity of his present position. It is then possible to indicate with a much higher degree of accuracy the actual position of the aircraft by the location of the intersection of the pointers 42 and 53 with reference to the reference position 43 when the latter corresponds to the position of the waypoint rather than to the position of the reference point. In general this is accomplished by opposing the voltages appearing between the contact arms 32—32' and 33—33' by voltages which correspond, respectively, to the rectangular coordinates of the waypoint with respect to the reference point. For this purpose a waypoint selector, shown generally at 58, is employed.

The waypoint selector 58 includes a variable resistance device 59 in the form of a potentiometer which is grounded at 60 at one terminal and is connected by a conductor 61 at the other terminal to a source of direct current counter voltage which is of opposite polarity to the voltage controlled by the distance measuring equipment 10. A contact arm 63, carried by a shaft 64, serves to pick off of the variable resistance device 59 a voltage corresponding to the distance or mileage between the reference point and the known waypoint that is selected to correspond to the reference position 43 on the face 44. A knob 65, fast on the shaft 64, serves to rotate it to the desired position. It will be understood that the knob 65 moves with reference to a scale that is calibrated in miles.

Since it is necessary to maintain the same range setting for the waypoint selector 58 that is used for the sine-cosine resolver 25, the variable resistance device 59 is connected by a conductor 66 to a variable resistance device 67 in the form of a potentiometer which is grounded at 68. A contact arm 69, carried by the shaft 20, of the range multiplier 18 serves to pick off of the variable resistance device 67 the desired voltage corresponding to the range that it has been selected by the pilot to operate at.

The contact arm 69 is connected by a conductor 70 to a sine-cosine resolver that is shown, generally, at 71 and forms with the variable resistance device 59 the remaining principal parts of the waypoint selector 58. The sine-cosine resolver 71 is a duplicate of the sine-cosine resolver 25 previously described. It includes a sine impedance device 72 and a cosine impedance device 73 which are potentiometers that are circular in shape and are closed upon themselves. The conductor 70 is connected at 74 and 75 to the devices 72 and 73 respectively and they are grounded at 76 and 77 at diametrically opposite points. Contact arms 78—78' and 79—79' are mounted on a shaft 80 to rotate conjointly therewith. The contact arms 78—78' are located in 90° relationship on the shaft 80 to the contact arms 79 and 79' for the purposes previously pointed out. A knob 81, fast on the shaft 80, serves to rotate it to the desired position.

It will be understood that the knob 81 moves over a scale which is calibrated in degrees for the purpose of setting the sine-cosine resolver 71 at a position which corresponds to the rectangular coordinates of the waypoint. The sine impedance device 72 is connected by conductors 82 and 82' through isolating resistors 83, of the order of 20,000 ohms each, to the vertical pointer moving means 40. If desired a separate moving element can be employed on the vertical pointer moving means 40 to be responsive solely to the voltage from the sine impedance device 72. Conductors 85 and 85' interconnect the contact arms 79 and 79' through resistors 86 with the horizontal pointer moving means 51. As described, an additional moving element can be employed on the horizontal pointer moving means 51 to be responsive solely to the voltage appearing between the contact arms 79 and 79'.

In operation the pilot adjusts the waypoint selector 58 by moving the knobs 65 and 81 to positions in accordance with the distance that a selected waypoint is from a reference point and its rectangular coordinates with respect thereto. He then adjusts the knob 19 to position the range multiplier 18 so as to provide the maximum deflection of the pointers 42 and 53 under the given set of conditions. Further assuming now that the distance measuring equipment 10 is operating to provide a voltage which is a function of the distance between the aircraft and the reference point and the omni bearing indicator 14 shows the bearing of the course to the reference point, then the intersection of the pointers 42 and 53 will show on the face 44 the position of the aircraft with respect to the reference position 43 or with respect to the selected waypoint. Since the pilot of the aircraft knows the position of this waypoint, he can determine by reference to a chart and observation of the location of the intersection of the pointers 42 and 53 his exact position. By projecting a line on the face 44 of the cross pointer meter 37 corresponding to the desired course, the pilot can follow this prescribed course by directing the ship in such position that the intersection of the pointers 42 and 53 will take place along this line.

As the aircraft moves away from close proximity to a given waypoint, the pilot can select another waypoint generally along the desired course. Then the waypoint selector 58 is repositioned in accordance with the new waypoint and the range multiplier 18 is adjusted to provide the maximum degree of magnification necessary to enlarge the area represented by the instrument to arbitrarily a three mile radius, for example, for observing drift or progress along a small integrant of course.

The use of the system shown in Figure 1 for navigating an aircraft can be facilitated by employing a distance indicating and compass card 87 as shown in Figure 2. This card can be a thin plastic transparent sheet which can be located in front of the face 44 of the cross pointer meter 37 and underneath the pointers 42 and 53. The card 87 is stationarily mounted and is provided with a series of concentric circles 88 that are spaced uniformly apart to indicate distance of the ship from the reference position 43 which, as previously indicated, can be a waypoint. The several concentric circles 88 represent a distance on the ground depending upon the setting of the range multiplier 18. The outermost circle 88 is calibrated in degrees for the purpose of showing the heading of the aircraft.

Cooperating with the distance indicating and compass card 87 is a drift and heading indicating card 89 that is rotatable about the reference position 43 and, as indicated, is arranged to be rotated manually or by a magnetic direction indicator compass that is shown schematically at 90. An arrow head on index line 91 shows with reference to the scale on the compass card 87 the heading of the aircraft. The drift and heading indicating card 89 is provided with a grid formed by parallel lines 92 which are spaced apart the same distance that the concentric circles 88 are spaced apart and they are employed for displaying the progress of the ship along a course parallel to a similar course through the waypoint shown at the reference position 43 as indicated by the index line 91 and its azimuth reading.

It will be understood that the drift and heading indicating card 89 is formed of thin transparent material and that it may be positioned parallel to the compass card 87 and in front of the pointers 42 and 53. In order to reduce parallax to a minimum the cards 87 and 89 are placed as close together as mechanical clearances between them and the pointers 42 and 53 will permit.

Since certain changes can be made in the foregoing construction and different embodiments of the invention can be made without departing from the spirit and scope thereof, it is intended that all matters shown in the accompanying drawings and described hereinbefore shall be interpreted as illustrative and not in a limiting sense.

What is claimed as new is:

1. In a navigational system for a dirigible craft, the combination of distance measuring means thereon providing a voltage the magnitude of which represents the distance the craft is from a reference point on the earth, a pair of impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point, a pair of waypoint impedance devices each closed upon itself, means for applying a voltage across diametrically opposite points of said waypoint impedances the magnitude of which represents the distance a waypoint is from said reference point, a pair of contacts for each waypoint impedance device for engaging the same at diametrically opposite points, means commonly mounting said pairs of waypoint contacts to engage the respective waypoint impedance device in 90° spaced relation and adjustable in accordance with the bearing of said waypoint with respect to said reference point, and measuring means connected to be responsive to the voltages between said pairs of contacts to show on the craft its position relative to said waypoint.

2. In a navigational system for a dirigible craft, the combination of distance measuring means thereon providing a voltage the magnitude of which represents the distance the craft is from a reference point on the earth, a pair of impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point, a pair of waypoint impedance devices each closed upon itself, means for applying a voltage across diametrically opposite points of said waypoint impedances the magnitude of which represents the distance a waypoint is from said reference point, a pair of contacts for each waypoint impedance device for engaging the same at diametrically opposite points, means commonly mounting said pairs of waypoint contacts to engage the respective waypoint impedance device in 90° spaced relation and adjustable in accordance with the bearing of said waypoint with respect to said reference point, measuring means connected to be responsive to the voltages between said pairs of contacts to show on the craft its position relative to said waypoint, and a pair of conjointly operable variable impedance devices individual to the voltages applied across said pairs of impedance devices to change the voltages between said pairs of contacts and show on the craft at a corresponding scale its position relative to said waypoint.

3. In a navigational system for a dirigible craft, the combination of distance measuring means thereon providing a voltage the magnitude of which represents the distance the craft is from a reference point on the earth, a pair of impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point, a pair of waypoint impedance devices each closed upon itself, means for applying a voltage across diametrically opposite points of said waypoint impedances the magnitude of which represents the distance a waypoint is from said reference point, a pair of contacts for each waypoint impedance device for engaging the same at diametrically opposite points, means commonly mounting said pairs of waypoint contacts to engage the respective waypoint impedance device in 90° spaced relation and adjustable in accordance with the bearing of said waypoint with respect to said reference point, a cross pointer meter having a face with a reference position corresponding to said waypoint, a vertical pointer movable to the right and left of said reference position, means for moving said vertical pointer connected to be responsive to the voltages between corresponding pairs of contacts of the first and second mentioned impedance devices, a horizontal pointer movable above and below said reference position, and means for moving said horizontal pointer connected to be responsive to the voltages between the other corresponding pairs of contacts of said first and second mentioned impedance devices, the intersection of said pointers corresponding to the position of the craft.

4. In a navigational system for a dirigible craft, the combination of distance measuring equipment thereon providing a direct current voltage the magnitude of which represents the distance the craft is from a reference point on the earth, a pair of circular potentiometers each closed upon itself and having said voltage applied across diametrically opposite points thereof, a pair of contacts for each potentiometer for engaging the same at diametrically opposite points, means commonly mounting said pairs of contacts to engage the respective potentiometer in 90° spaced relation, means operatively connected to said mounting means to position said pairs of contacts according to the bearing of the craft with respect to said reference point, a cross pointer meter having a face with a reference position corresponding to said reference point, a vertical pointer movable to the right and left of said reference position, means for moving said vertical pointer connected to be responsive to the voltage between one of said pairs of contacts, a horizontal pointer movable above and below said reference position, and means for moving said horizontal pointer connected to the other of said pairs of contacts, the intersection of said pointers corresponding to the position of the craft.

5. In a navigational system for a dirigible craft, the combination of distance measuring equipment thereon providing a direct current voltage the magnitude of which represents the distance the craft is from a reference point on the earth, a pair of circular potentiometers each closed upon itself and having said voltage applied across diametrically opposite points thereof, a pair of contacts for each potentiometer for engaging the same at diametrically opposite points, means commonly mounting said pairs of contacts to engage the respective potentiometer in 90° spaced relation, means operatively connected to said mounting means to position said pairs of contacts according to the bearing of the craft with respect to said reference point, a pair of circular waypoint potentiometers each closed upon itself, means for applying a direct current voltage across diametrically opposite points of said waypoint potentiometers the magnitude of which represents the distance a waypoint is from a reference point, a pair of contacts for each waypoint potentiometer for engaging the same at diametrically opposite points, means commonly mounting said pairs of waypoint contacts to engage the respective waypoint potentiometer in 90° spaced relation and adjustable in accordance with the bearing of said waypoint with respect to said reference point, a cross pointer meter having a face with a reference position corresponding to said waypoint, a vertical pointer movable to the right and left of said reference position, means for moving said vertical pointer connected to be responsive to the voltages between corresponding pairs of contacts of the first and second mentioned potentiometers, a horizontal pointer movable above and below said reference position, and means for moving said horizontal pointer connected to be responsive to the voltages between the other corresponding pairs of contacts of said first and second mentioned potentiometers, the intersection of said pointers corresponding to the position of the craft.

6. In a navigational system for a dirigible craft, the combination of distance measuring equipment thereon providing a direct current voltage the magnitude of which represents the distance the craft is from a reference point on the earth, a pair of circular potentiometers each closed upon itself and having said voltage applied across diametrically opposite points thereof, a pair of contacts for each potentiometer for engaging the same at diametrically opposite points, means commonly mounting said pair of contacts to engage the respective potentiometer in 90° spaced relation, means operatively connected to said mounting means to position said pairs of contacts according to the bearing of the craft with respect to said reference point, a pair of circular waypoint potentiometers each closed upon itself, means for applying a direct current voltage across diametrically opposite points of said waypoint potentiometers the magnitude of which represents the distance a waypoint is from a reference point, a pair of contacts for each waypoint potentiometer for engaging the same at diametrically opposite points, means commonly mounting said pairs of waypoint contacts to engage the respective waypoint potentiometer in 90° spaced relation and adjustable in accordance with the bearing of said waypoint with respect to said reference point, a cross pointer meter having a face with a reference position corresponding to said waypoint, a vertical pointer movable to the right and left of said reference position, means for moving said vertical pointer connected to be responsive to the voltages between corresponding pairs of contacts of the first and second mentioned potentiometers, a horizontal pointer movable above and below said reference position, means for moving said horizontal pointer connected to be responsive to the voltages between the other corresponding pairs of contacts of said first and second mentioned potentiometers, and a pair of conjointly operable variable resistance devices individual to the voltages applied across said pairs of potentiometers to vary the voltages between said pairs of contacts and show by the intersection of said pointers at a magnified scale its position relative to said waypoint.

7. In a navigational system for a dirigible craft, the combination of distance measuring means thereon providing a voltage the magnitude of which represents the distance the craft is from a reference point on the earth, a pair of impedance devices each closed upon itself and having said voltage applied across diametrically opposite points thereof, a pair of contacts for each impedance device for engaging the same at diametrically opposite points, means commonly mounting said pairs of contacts to engage the respective impedance device in 90° spaced relation, means operatively connected to said mounting means to position said pairs of contacts according to the bearing of the craft with respect to said reference point, a cross pointer meter having a face with a reference position corresponding to said reference point, a vertical pointer movable to the right and left of said reference position, means for moving said vertical pointer connected to one of said pairs of contacts, a horizontal pointer movable above and below said reference position, means for moving said horizontal pointer connected to the other of said pairs of contacts, the intersection of said pointers corresponding to the position of the craft, heading indicating means rotatable about an axis through said reference position and adjacent said pointers, and compass means connected to said heading indicating means for positioning the same.

References Cited in the file of this patent

UNITED STATES PATENTS

| | | |
|---|---|---|
| 2,404,387 | Lovell et al. | July 23, 1946 |
| 2,530,428 | Gray | Nov. 21, 1950 |
| 2,541,277 | Omberg et al. | Feb. 13, 1951 |
| 2,560,527 | Dehmel | July 10, 1951 |
| 2,578,666 | Borden | Dec. 18, 1951 |

OTHER REFERENCES

Fritze: "Punched Card Controlled Aircraft Navigation Computer," Proceedings of the I. R. E., vol. 41, No. 6, June 1953, pages 734–742.